United States Patent
Miyoshi

(10) Patent No.: US 7,076,718 B2
(45) Date of Patent: Jul. 11, 2006

(54) RECEIVER APPARATUS AND COMMUNICATION METHOD

(75) Inventor: Kenichi Miyoshi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 153 days.

(21) Appl. No.: 10/489,969

(22) PCT Filed: Jun. 24, 2003

(86) PCT No.: PCT/JP03/07956

§ 371 (c)(1),
(2), (4) Date: Mar. 18, 2004

(87) PCT Pub. No.: WO2004/004195

PCT Pub. Date: Jan. 8, 2004

(65) Prior Publication Data

US 2004/0255203 A1    Dec. 16, 2004

(30) Foreign Application Priority Data

Jul. 1, 2002   (JP) ............... 2002-192209

(51) Int. Cl.
  *H04L 1/18*   (2006.01)
(52) U.S. Cl. .................................... 714/748
(58) Field of Classification Search ......... 714/748, 714/749

See application file for complete search history.

(56) References Cited

U.S. PATENT DOCUMENTS

| | | | |
|---|---|---|---|
| 6,798,846 B1* | 9/2004 | Golitschek Edler Von Elbwart et al. | 375/298 |
| 2002/0046379 A1* | 4/2002 | Miki et al. | 714/749 |

FOREIGN PATENT DOCUMENTS

| | | |
|---|---|---|
| JP | 11177536 | 7/1999 |
| JP | 2001-53728 | 2/2001 |
| JP | 2001-119426 | 4/2001 |
| WO | 0021236 | 4/2000 |

* cited by examiner

*Primary Examiner*—Shelly Chase
(74) *Attorney, Agent, or Firm*—Stevens, Davis, Miller & Mosher, LLP

(57) ABSTRACT

A communication apparatus and method may calculate the quality of a received packet, combine the received packet with another packet, perform error detection on the combined packet if the calculated quality exceeds a threshold, and transmit a retransmission request when the calculated quality does not exceed the threshold or an error is detected in the combined packet. Additionally, the apparatus and method may combine a first received packet with another packet to produce a first combined packet, combine a second received packet with the first combined packet to produce a second combined packet, calculate the respective qualities of the first and second combined packets, and perform error detection on the second combined packet if its calculated quality exceeds that of the first combined packet. A retransmission request is transmitted when the first calculated quality exceeds the second calculated quality or an error is detected in the second combined packet.

7 Claims, 6 Drawing Sheets

US 7,076,718 B2

RECEIVER APPARATUS AND COMMUNICATION METHOD

TECHNICAL FIELD

The present invention relates to a reception apparatus and communication method used in a radio communication system that applies ARQ (Automatic Repeat Request).

BACKGROUND ART

ARQ is used in a radio communication system that performs fast packet transmission ARQ to improve data reception performance.

ARQ is a method for automatically performing processing that a transmitting side retransmits a data unit (frame) in which an error is detected on a receiving side. A system is disclosed where in a conventional ARQ system, a receiving side combines an already received packet and retransmitted packet, and performs error correcting processing on the combined packet.

However, in the conventional ARQ system, since the receiving side combines all the retransmitted packets to perform error correcting processing, when propagation environments on a radio channel deteriorate and quality of a retransmitted packet deteriorates in retransmitting the packet, quality of the combined packet deteriorates and ARQ quality deteriorates.

DISCLOSURE OF INVENTION

It is an object of the present invention to provide a reception apparatus and communication method capable of preventing deterioration of ARQ performance even when radio channel quality deteriorates.

The object is achieved by determining a state of the radio channel quality in receiving a packet, and combining only a packet received in a state where the radio channel quality is good.

BEST MODE FOR CARRYING OUT THE INVENTION

Embodiments of the present invention will be described specifically below with reference to accompanying drawings.

(Embodiment 1)

Figure 1:
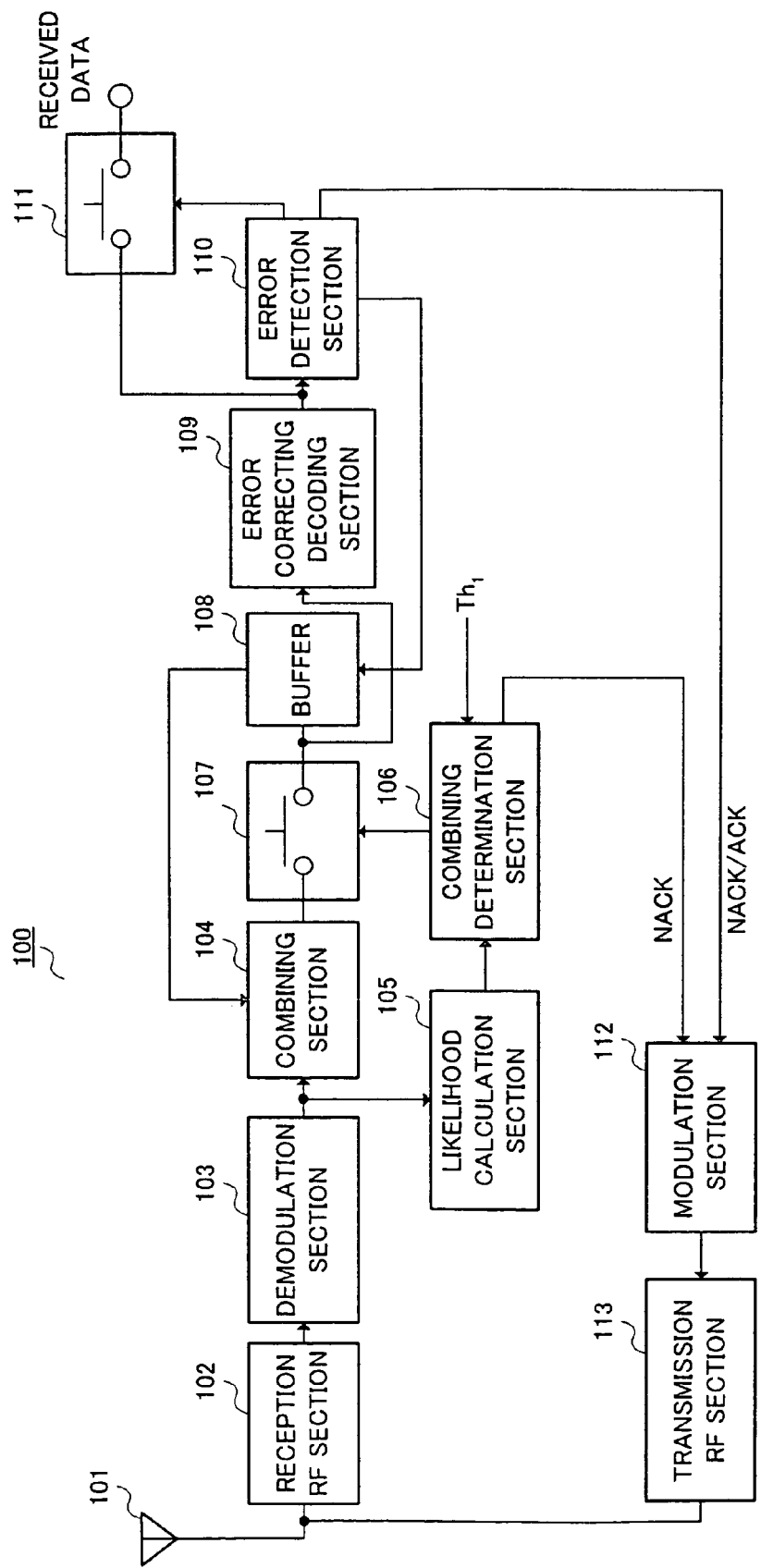
FIG. 1 is a block diagram illustrating a configuration of a reception apparatus according to Embodiment 1 of the present invention.

FIG. 1 is a block diagram illustrating a configuration of a reception apparatus according to Embodiment 1 of the present invention. Reception apparatus 100 as illustrated in FIG. 1 has antenna 101, reception RF section 102, demodulation section 103, combining section 104, likelihood calculation section 105, combining determination section 106, switch 107, buffer 108, error correcting decoding section 109, error detection section 110, switch 111, modulation section 112 and transmission RF section 113.

Reception RF section 102 performs predetermined radio processing on a signal received in antenna 101, and outputs a baseband signal to demodulation section 103. Demodulation section 103 demodulates the output signal from reception RF section 102 to output to combining section 104 and likelihood calculation section 105.

Combining section 104 combines the output signal from demodulation section 103 and the signal stored in buffer 108, and outputs a combined signal to switch 107. Likelihood calculation section 105 calculates the likelihood of the output signal from demodulation section 103, and outputs information indicative of the likelihood to combining determination section 106.

Combining determination section 106 compares the likelihood calculated in likelihood calculation section 105 with a predetermined threshold Th1, and when the likelihood is more than the threshold Th1, makes switch 107. As a result, when the likelihood is more than the threshold Th1, the signal combined in combining section 104 is input to buffer 108 and error correcting decoding section 109. Meanwhile, when the likelihood is less than or equal to the threshold Th1, combining determination section 106 outputs a signal (NACK signal) of a command for requesting retransmission to modulation section 112. In this way, since it is possible to detect a packet received in a state where the radio channel quality deteriorates before error correcting decoding and to transmit a retransmission request command to a communicating party, it is possible to reduce a calculation amount in ARQ and further reduce power consumption.

Buffer 108 outputs a stored signal to combining section 104, and when receiving a new signal input via switch 107, overwrites and stores the signal.

Error correcting decoding section 109 performs error correcting decoding such as Viterbi decoding on a signal input via switch 107 to output to error detection section 110.

Error detection section 110 performs error detection (CRC decision) on an output signal of error correcting decoding section 109, and when detecting an error, outputs a signal (NACK signal) of a command for requesting retransmission to modulation section 112. Meanwhile, when an error is not detected, error detection section 110 deletes the signal stored in buffer 108, makes switch 111, and outputs a signal (ACK signal) of a command for requesting transmission of a new packet to modulation section 112. When an error is not detected as a result, received data output from error correcting decoding section 109 is output to an apparatus for performing post-processing, not shown.

Modulation section 112 modulates the NACK signal output from combining determination section 106 or error detection section 110, or the ACK signal output from error detection section 110 to output to transmission RF section 113. Transmission RF section 113 converts the output signal from modulation section 112 into a radio-frequency signal, and the radio signal is transmitted from antenna 101.

ARQ in this Embodiment will be described specifically below with reference to FIG. 2.

Figure 2:
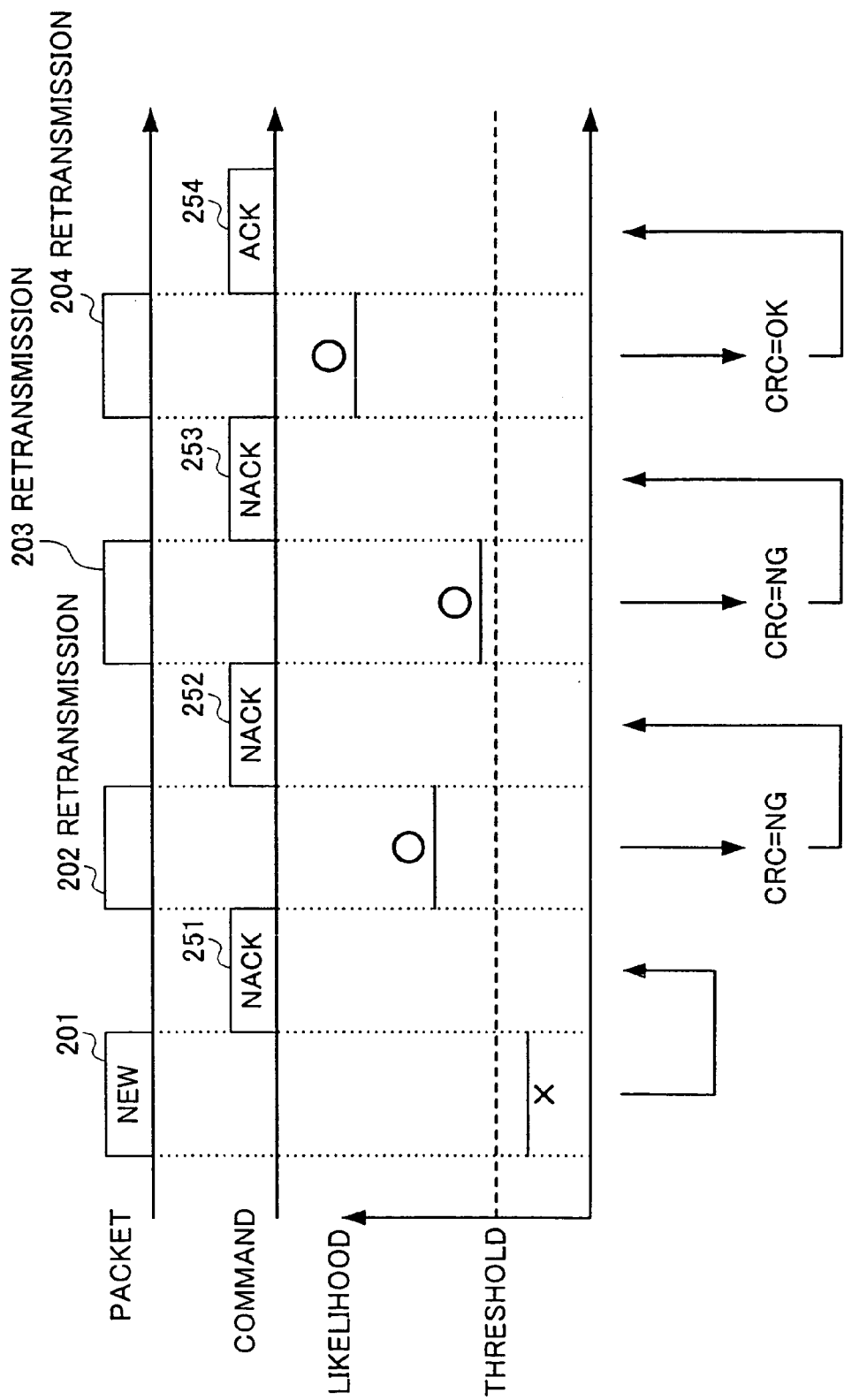
FIG. 2 is a view for specifically illustrating ARQ of Embodiment 1 of the present invention.

In FIG. 2, it is assumed that reception apparatus 100 first receives new packet 201. In reception apparatus 100, likelihood calculation section 105 calculates the likelihood of packet 201, and combining determination section 106 compares the likelihood with the threshold Th1. When the likelihood is less than or equal to the threshold Th1 as a result of comparison, reception apparatus 100 determines that packet 201 is received in a state where the radio channel quality deteriorates, does not perform error correcting decoding and error detection on packet 201, and transmits NACK signal 251 to a transmission apparatus of the communicating party.

Next, reception apparatus 100 receives retransmitted packet 202, likelihood calculation section 105 calculates the likelihood of packet 202, and combining determination section 106 compares the likelihood with the threshold Th1. When the likelihood is more than the threshold Th1 as a result of comparison, reception apparatus 100 stores packet 202 in buffer 108, error correcting decoding section 109 performs error correcting decoding on packet 202, and error detection section 110 performs error detection on the packet. When an error is detected (CRC=NG) as a result, reception section 100 transmits NACK signal 252 to the transmission apparatus of the communicating party.

Then, reception apparatus 100 receives retransmitted packet 203, likelihood calculation section 105 calculates the likelihood of packet 203, and combining determination section 106 compares the likelihood with the threshold Th1. When the likelihood is more than the threshold Th1 as a result of comparison, reception apparatus 100 stores a combined packet (202+203) in buffer 108, error correcting decoding section 109 performs error correcting decoding on the combined packet (202+203), and error detection section 110 performs error detection on the packet. When an error is detected (CRC=NG) as a result, reception section 100 transmits NACK signal 253 to the transmission apparatus of the communicating party.

Next, reception apparatus 100 receives retransmitted packet 204, likelihood calculation section 105 calculates the likelihood of packet 204, and combining determination section 106 compares the likelihood with the threshold Th1. When the likelihood is more than the threshold Th1 as a result of comparison, reception apparatus 100 stores a combined packet (202+203+204) in buffer 108, error correcting decoding section 109 performs error correcting decoding on the combined packet (202+203+204), and error detection section 110 performs error detection on the packet. When an error is not detected (CRC=OK) as a result, reception section 100 deletes the content of buffer 108, and transmits ACK signal 254 to the transmission apparatus of the communicating party.

In this way, the likelihood of a demodulated received packet is compared with a predetermined threshold, a state of radio channel quality in receiving the packet is thus determined, and a packet received in a state where the radio channel quality is good is only combined, whereby it is possible to prevent the quality of the combined packet from deteriorating and to further prevent the performance of ARQ from deteriorating.

In addition, this Embodiment describes the threshold Th1 used in the combining determination section as a predetermined value, but the present invention is not limited to the foregoing, and the threshold Th1 may be controlled variably. For example, it may be possible that an error rate is detected, and the threshold Th1 is determined so as to keep the error rate at a constant value.

(Embodiment 2)

Figure 3:
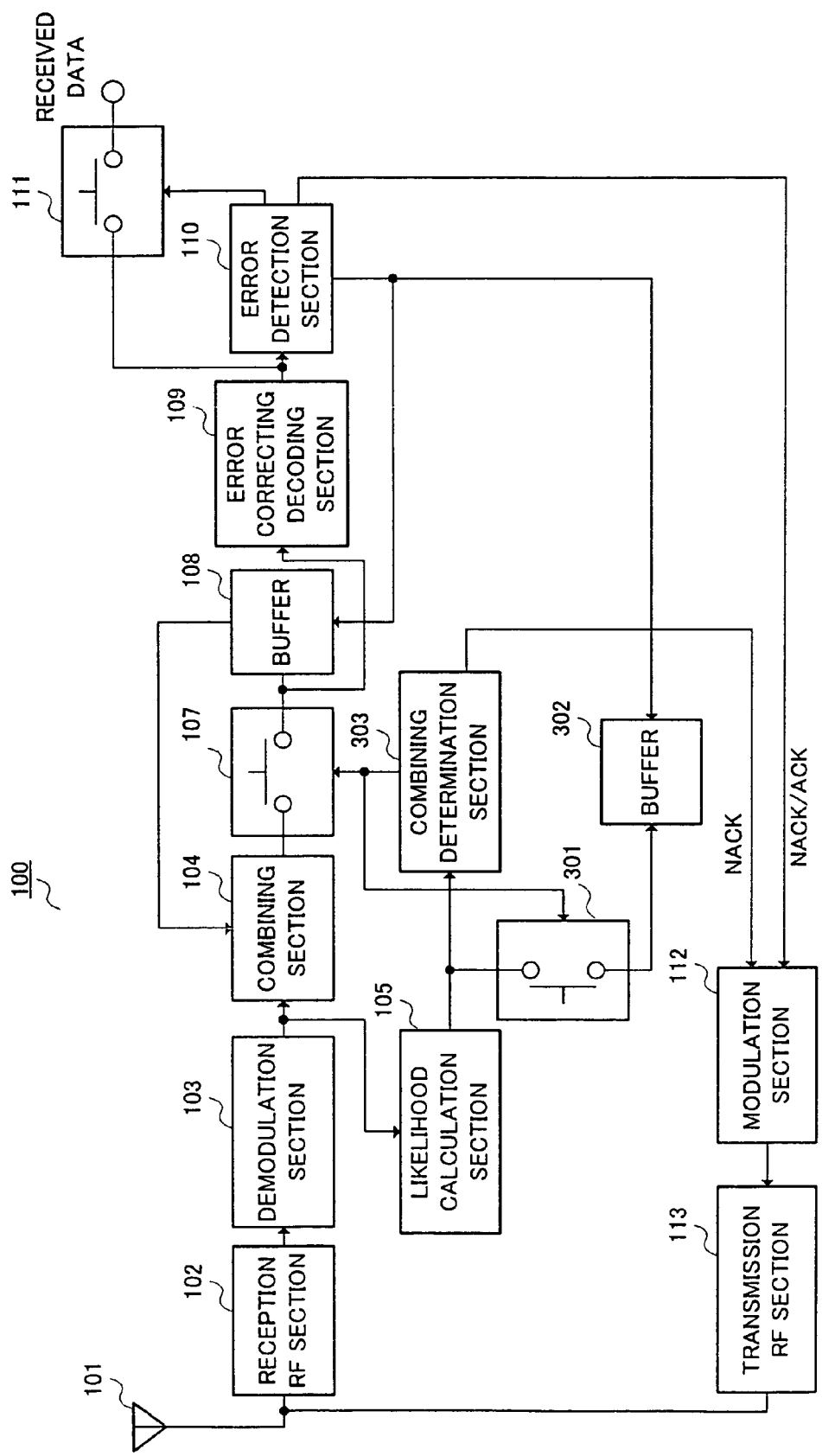
FIG. 3 is a block diagram illustrating a configuration of a reception apparatus according to Embodiment 2 of the present invention.

FIG. 3 is a block diagram illustrating a configuration of a reception apparatus according to Embodiment 2 of the present invention. In reception apparatus 300 as illustrated in FIG. 3, sections common to reception apparatus 100 as illustrated in FIG. 1 are assigned the same reference numerals to omit descriptions thereof.

Reception apparatus 300 as illustrated in FIG. 3 further has switch 301 and buffer 302 as compared with FIG. 1. In reception apparatus 300 as illustrated in FIG. 3, the function of combining determination section 303 is different from that of combining determination section 106 in FIG. 1.

Demodulation section 103 demodulates an output signal from reception RF section 102 to output to combining section 104. Combining section 104 combines the output signal from demodulation section 103 and a signal stored in buffer 108, and outputs a combined signal to likelihood calculation section 105 and switch 107. Likelihood calculation section 105 calculates the likelihood of the signal combined in combining section 104, and outputs information indicative of the likelihood to switch 301 and combining determination section 303.

Buffer 302 outputs the stored likelihood information to combining determination section 303, while overwriting and storing likelihood information when receiving the new likelihood information input via switch 301.

Combining determination section 303 compares the likelihood (hereinafter referred to as "current likelihood") calculated in likelihood calculation section 105 with the likelihood (hereinafter referred to as "last likelihood") stored in buffer 302, and when the current likelihood is more than the last likelihood, makes switches 107 and 301. Meanwhile, when the current likelihood is less than or equal to the last likelihood, combining determination section 303 outputs a signal (NACK signal) of a command for requesting retransmission to modulation section 112. As a result, when the current likelihood is more than the last likelihood, the information indicative of the likelihood calculated in likelihood calculation section 105 is input to buffer 302, and the signal combined in combining section 104 is input to buffer 108 and error correcting decoding section 109.

When an error is not detected, error detection section 110 deletes the signal stored in buffer 108 and the likelihood information stored in buffer 302, makes switch 111, and outputs a signal (ACK signal) of a command for requesting transmission of a new packet to modulation section 112.

ARQ in this Embodiment will be described specifically below with reference to FIG. 4.

Figure 4:
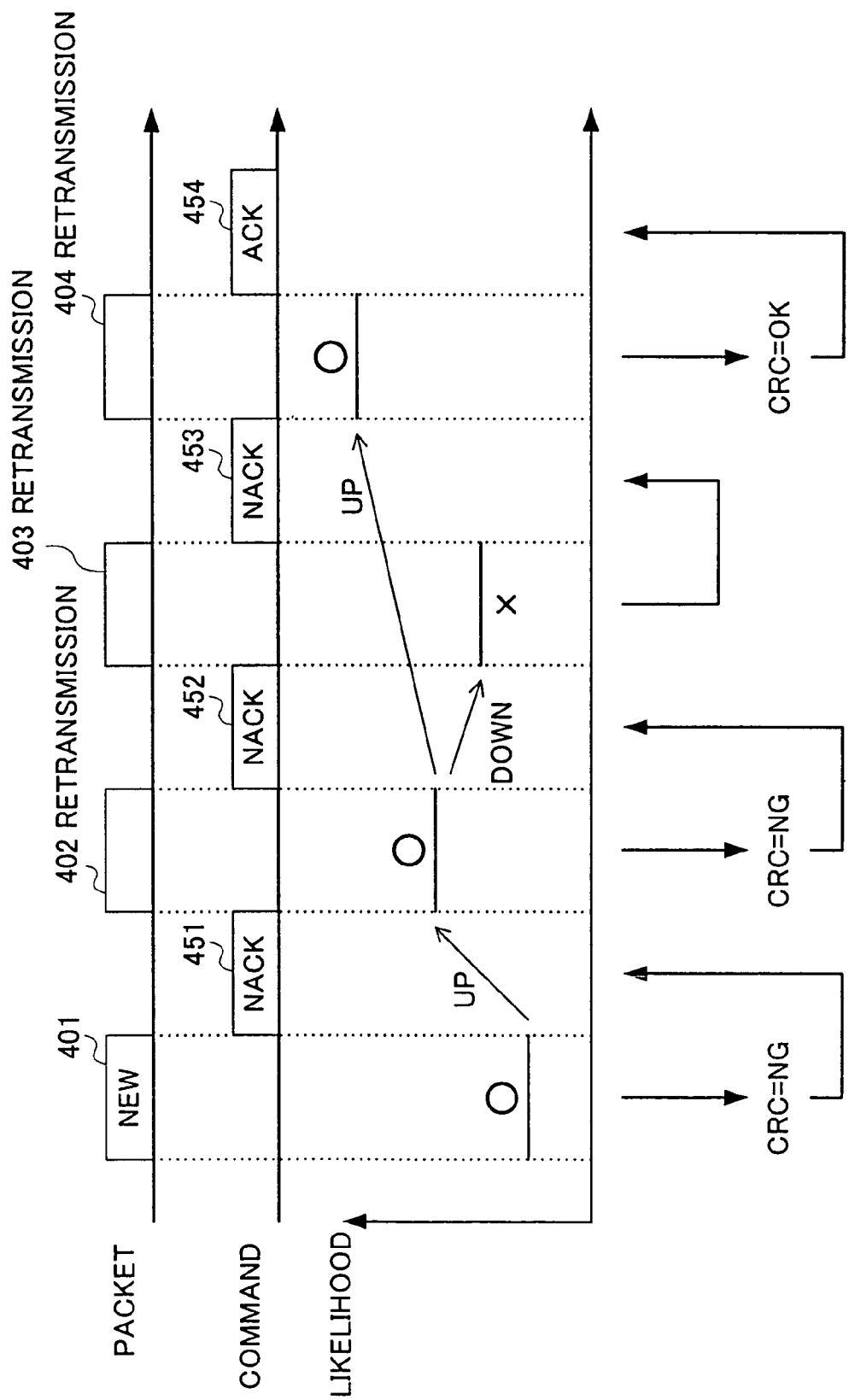
FIG. 4 is a view for specifically illustrating ARQ of Embodiment 2 of the present invention.

In FIG. 4, it is assumed that reception apparatus 300 first receives new packet 401. In reception apparatus 300, likelihood calculation section 105 calculates the likelihood of packet 401. At this point, since the last likelihood is not present, reception apparatus 300 stores the current likelihood in buffer 301, and stores packet 401 in buffer 108, error correcting decoding section 110 performs error correcting decoding on packet 401, and error detection section 110 performs error detection on the packet. As a result, when an error is detected (CRC=NG), reception apparatus 300 transmits NACK signal 451 to a transmission apparatus of the communicating party.

Next, reception apparatus 300 receives retransmitted packet 402, likelihood calculation section 105 calculates the likelihood of a combined packet (401+402), and combining determination section 303 compares the current likelihood with the last likelihood. As a result of comparison, when the current likelihood is more than the last likelihood, reception apparatus 300 stores the current likelihood in buffer 302, and stores the combined packet (401+402) in buffer 108, error correcting decoding section 109 performs error correcting decoding on the combined packet (401+402), and error detection section 110 performs error detection on the packet. As a result, when an error is detected (CRC=NG), reception apparatus 300 transmits NACK signal 452 to the transmission apparatus of the communicating party.

Then, reception apparatus 300 receives retransmitted packet 403, combining section 104 combines the combined packet (401+402) and packet 403, likelihood calculation section 105 calculates the likelihood of combined packet (401+402+403), and combining determination section 303 compares the current likelihood with the last likelihood. As a result of comparison, when the current likelihood is less that or equal to the last likelihood, reception apparatus 300 determines that packet 403 is received in a state where the radio channel quality deteriorates, does not perform error correcting decoding and error detection on the combined packet (401+402+403), and transmits NACK signal 453 to the transmission apparatus of the communicating party.

Next, reception apparatus 300 receives retransmitted packet 404, combining section combines the combined packet (401+402) and packet 404, likelihood calculation section 105 calculates the likelihood of combined packet (401+402+404), and combining determination section 303 compares the current likelihood with the last likelihood. As a result of comparison, when the current likelihood is more than the last likelihood, reception apparatus 300 stores the current likelihood in buffer 302 and further stores the combined packet (401+402+404) in buffer 108, error correcting decoding section 109 performs error correcting decoding on the combined packet (401+402+404), and error detection section 110 performs error detection on the packet. As a result, when an error is not detected (CRC=OK), reception apparatus 300 deletes the content of buffer 108 and buffer 302, and transmits ACK signal 454 to the transmission apparatus of the communicating party.

In this way, the current likelihood is compared with the last likelihood to determine a state of radio channel quality in receiving the packet, and a packet received in a state where the radio channel quality is good is only combined, whereby it is possible to prevent the quality of the combined packet from deteriorating and to further prevent the performance of ARQ from deteriorating.

(Embodiment 3)

Figure 5:
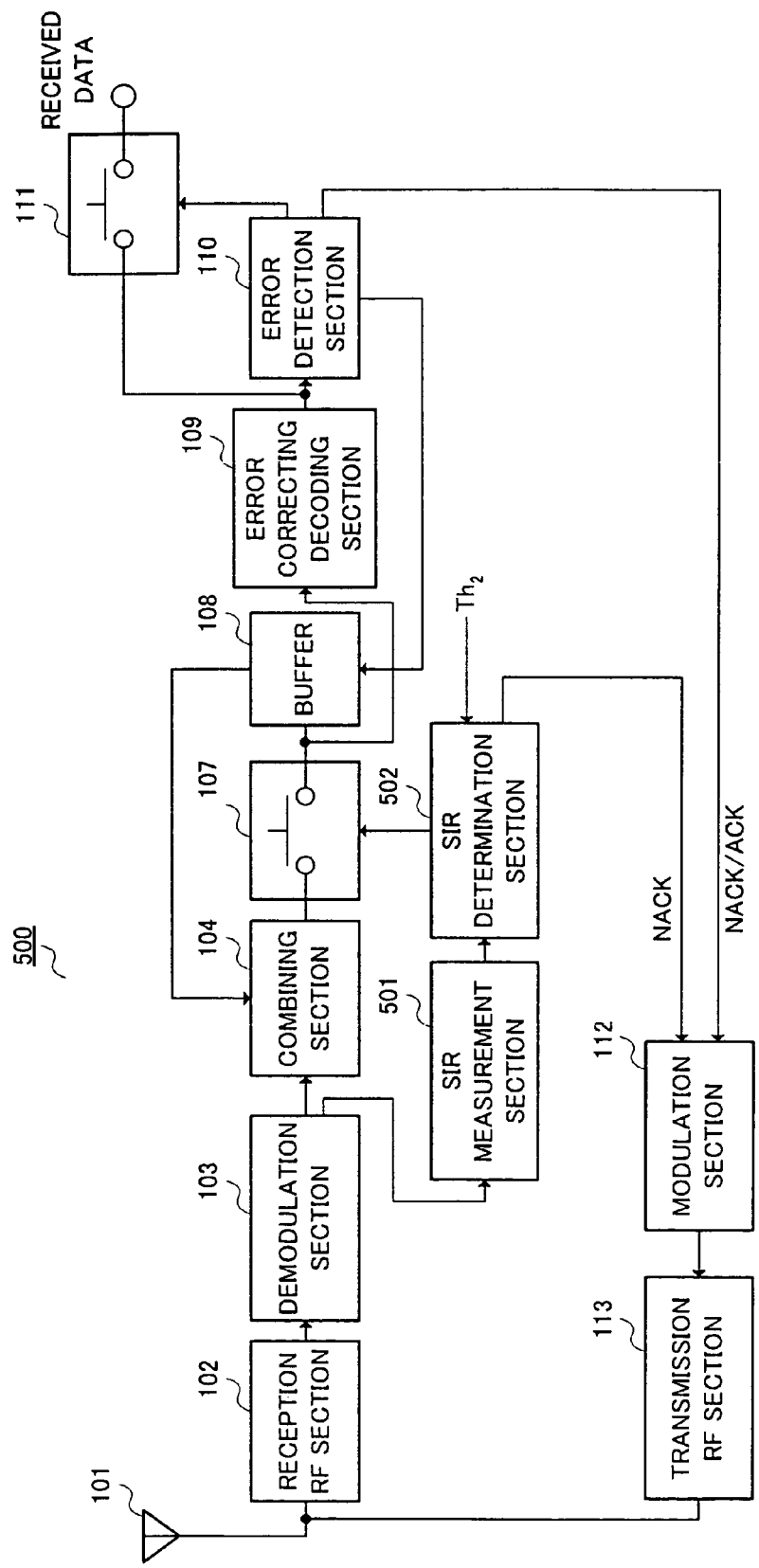
FIG. 5 is a block diagram illustrating a configuration of a reception apparatus according to Embodiment 3 of the present invention.

FIG. 5 is a block diagram illustrating a configuration of a reception apparatus according to Embodiment 3 of the present invention. In reception apparatus 500 as illustrated in FIG. 5, sections common to reception apparatus 100 as illustrated in FIG. 1 are assigned the same reference numerals to omit descriptions thereof.

As compared to FIG. 1, reception apparatus 500 as illustrated in FIG. 5 has the configuration with likelihood calculation section 105 and combining determination section 106 eliminated and SIR measurement section 501 and SIR determination section 502 added.

Demodulation section 103 outputs a desired signal level and interfering signal level measured during demodulation to SIR measurement section 501.

SIR measurement section 501 measures a ratio (SIR) of the desired signal level to the interfering signal level, and outputs information indicative of SIR to SIR determination section 502.

SIR determination section 502 compares SIR measured in SIR measurement section 501 with a predetermined threshold Th2 and when SIR is more than the threshold Th2 makes switch 107, while outputting a signal (NACK signal) of a command for requesting retransmission to modulation section 112 when SIR is less than or equal to the threshold Th2 As a result, when SIR is more than the threshold Th2 the signal combined in combining section 104 is input to buffer 108 and error correcting decoding section 109.

ARQ in this Embodiment will be described specifically below with reference to FIG. 6.

Figure 6:
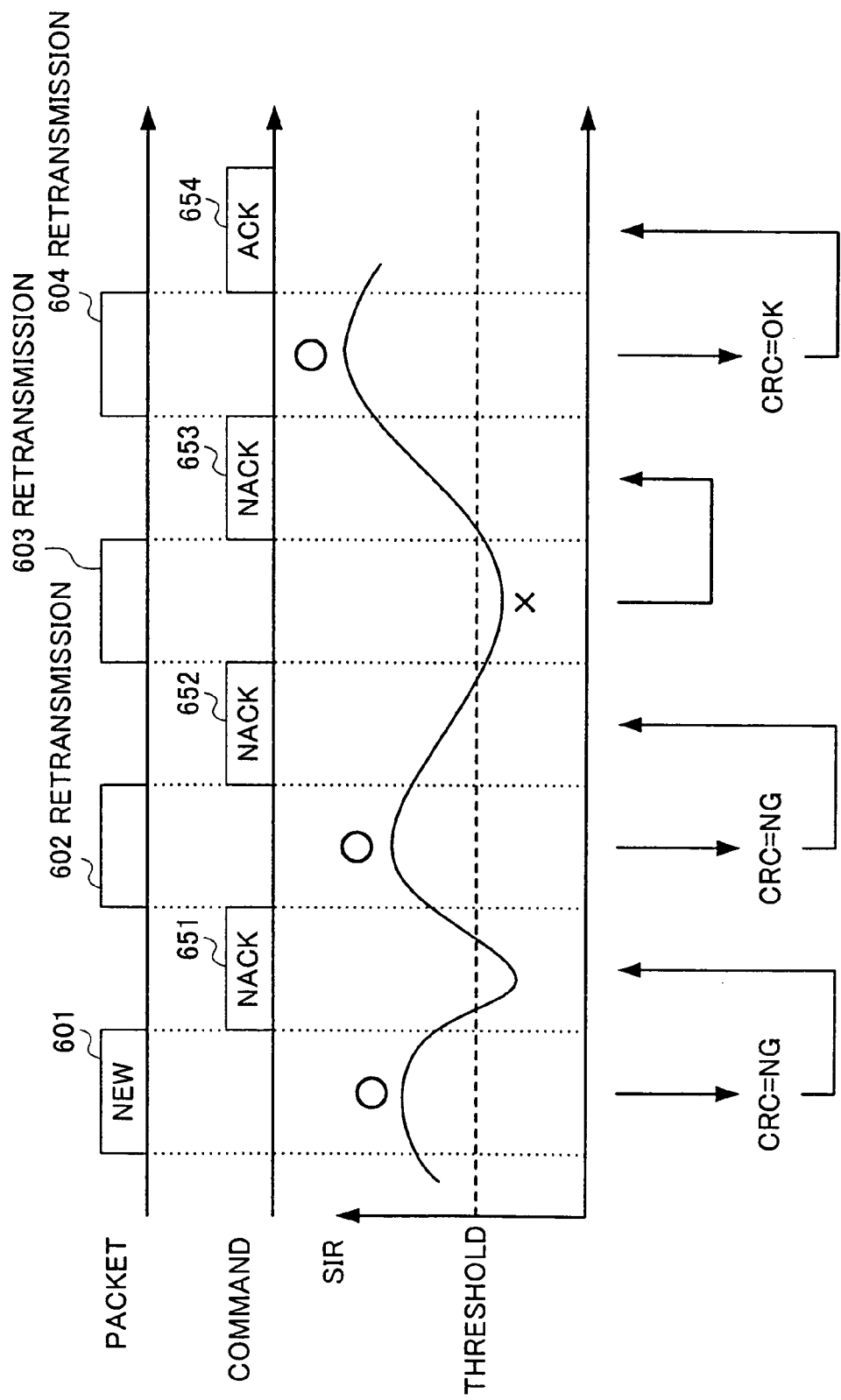
FIG. 6 is a view for specifically illustrating ARQ of Embodiment 3 of the present invention.

In FIG. 6, it is assumed that reception apparatus 500 first receives new packet 601. In reception apparatus 500, SIR measurement section 501 measures SIR (Signal to Interference Ratio) of packet 601, and SIR determination section 502 compares SIR with the threshold Th2 As a result of comparison, when SIR is more than the threshold Th2 reception apparatus 500 stores packet 601 in buffer 108, error correcting decoding section 109 performs error correcting decoding on packet 601, and error detection section 110 performs error detection on the packet. When an error is detected (CRC=NG) as a result, reception section 500 transmits NACK signal 651 to the transmission apparatus of the communicating party.

Next, reception apparatus 500 receives retransmitted packet 602, combining section 104 combines packet 601 and packet 602, SIR measurement section 501 measures SIR of packet 602, and SIR determination section 502 compares SIR with the threshold Th2. As a result of comparison, when SIR is more than the threshold Th2 reception apparatus 500 stores the combined packet (601+602) in buffer 108, error correcting decoding section 109 performs error correcting decoding on the combined packet (601+602), and error detection section 110 performs error detection on the packet. When an error is detected (CRC=NG) as a result, reception section 500 transmits NACK signal 652 to the transmission apparatus of the communicating party.

Then, reception apparatus 500 receives retransmitted packet 603, combining section 104 combines the combined packet (601+602) and packet 603, SIR measurement section 501 measures SIR of packet 603, and SIR determination section 502 compares SIR of packet 603 with the threshold Th2. As a result of comparison, when SIR is equal to or less than the threshold Th2, reception apparatus 500 determines that packet 603 is received in a state where the radio channel quality deteriorates, does not perform error correcting decoding and error detection on the combined packet (601+ 602+603), and transmits NACK signal 653 to the transmission apparatus of the communicating party.

Next, reception apparatus 500 receives retransmitted packet 604, combining section 104 combines the combined packet (601+602) and packet 604, SIR measurement section 501 measures SIR of packet 604, and SIR determination section 502 compares SIR of packet 604 with the threshold Th2. As a result of comparison, when SIR is more than the threshold Th2, reception apparatus 500 stores the combined packet (601+602+604) in buffer 108, error correcting decoding section 109 performs error correcting decoding on the combined packet (601+602+604), and error detection section 110 performs error detection on the packet. As a result, when an error is not detected (CRC=OK), reception apparatus 500 deletes the content of buffer 108, and transmits ACK signal 654 to the transmission apparatus of the communicating party.

In this way, SIR is compared with a threshold to determine a state of radio channel quality in receiving the packet, and a packet received in a state where the radio channel quality is good is only combined, whereby it is possible to prevent the quality of the combined packet from deteriorating and to further prevent the performance of ARQ from deteriorating.

In addition, this Embodiment describes the threshold Th2 used in the combining determination section as a predetermined value, but the present invention is not limited to the foregoing, and the threshold Th2 may be controlled variably.

For example, it may be possible that an error rate is detected, and the threshold Th2 is determined so as to keep the error rate at a constant value.

Further, the above-mentioned Embodiments are capable of being combined as appropriate. For example, a reception apparatus may calculate SIR of a second combined packet obtained by combining an earlier combined first combined packet and received packet, select a received packet such that SIR of the second combined packet is more than SIR of the first combined packet, and perform error detection on the combined packet resulting from combining of the selected packet.

As is apparent from the foregoing, according to the present invention, by determining a state of radio channel quality in receiving a packet and combining a packet received in a state where the radio channel quality is good is only combined, it is possible to prevent the quality of the combined packet from deteriorating and to further prevent the performance of ARQ from deteriorating.

This application is based on the Japanese Patent Application No.2002-192209 filed on Jul. 1, 2002, entire content of which is expressly incorporated by reference herein.

INDUSTRIAL APPLICABILITY

The present invention is suitable for use in a communication terminal apparatus and base station apparatus in a radio communication system that applies ARQ (Automatic Repeat Request).

The invention claimed is:

1. A reception apparatus comprising:
   a demodulation section that demodulates a received packet;
   a channel quality estimation section that estimates radio channel quality of the demodulated received packet;
   a combining determination section that determines whether or not to combine the received packet based on the radio channel quality;
   a combining section that combines the received packet selected in the combining determination section to generate a first combined packet;
   an error correcting decoding section that performs error correcting decoding on the first combined packet; and
   an error detecting section which performs error detection on an output signal from the error correcting decoding section, and when an error is detected, transmits a retransmission request command to a communicating party, wherein the channel quality estimation section calculates likelihood of a second combined packet obtained by combining the first combined packet that is combined earlier and a received packet, and the combining determination section selects only a received packet such that the likelihood of the second combined packet is more than the likelihood of the first combined packet.

2. The reception apparatus according to claim 1, wherein the channel quality estimation section calculates a signal to interference ratio of a second combined packet obtained by combining the first combined packet that is combined earlier and a received packet, and the combining determination section selects only a received packet such that the signal to interference ratio of the second combined packet is more than the signal to interference ratio of the first combined packet.

3. The reception apparatus according to claim 1, wherein when the received packet is not selected, the combining determination section transmits the retransmission request command to the communicating party.

4. A communication method comprising employing a reception apparatus to perform operations of:
   demodulating a received packet to calculate likelihood,
   selecting a received packet whose likelihood is more than a first threshold,
   performing error detection on a combined packet resulting from combining of the selected packet, and
   when the likelihood of the received packet is less than or equal to the first threshold or an error is detected, transmitting a retransmission request command to a transmission apparatus of a communicating party.

5. A communication method comprising employing a reception apparatus to perform operations of:
   calculating likelihood of a second combined packet obtained by combining a first combined packet that is combined earlier and a received packet,
   selecting a received packet such that the likelihood of the second combined packet is more than the likelihood of the first combined packet,
   performing error detection on a combined packet resulting from combining of the selected packet, and
   when the likelihood of the second combined packet is less than or equal to the likelihood of the first combined packet or an error is detected, transmitting a retransmission request command to a transmission apparatus of a communicating party.

6. A communication method comprising employing a reception apparatus to perform operations of:
   calculating a signal to interference ratio of a received packet,
   selecting a received packet whose signal to interference ratio is more than a second threshold,
   performing error detection on a combined packet resulting from combining of the selected packet, and
   when the signal to interference ratio is less than or equal to the second threshold or an error is detected, transmitting a retransmission request command to a transmission apparatus of a communicating party.

7. A communication method comprising employing a reception apparatus to perform operations of:
   calculating a signal to interference ratio of a second combined packet obtained by combining a first combined packet that is combined earlier and a received packet,
   selecting a received packet such that the signal to interference ratio of the second combined packet is more than the signal to interference ratio of the first combined packet,
   performing error detection on a combined packet resulting from combining of the selected packet, and
   when the signal to interference ratio of the second combined packet is less than or equal to the signal to interference ratio of the first combined packet or an error is detected, transmitting a retransmission request command to a transmission apparatus of a communicating party.

* * * * *